(12) United States Patent
Gillum et al.

(10) Patent No.: US 7,647,380 B2
(45) Date of Patent: Jan. 12, 2010

(54) DATACENTER MAIL ROUTING

(75) Inventors: Eliot C. Gillum, Los Gatos, CA (US); David Braun, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 720 days.

(21) Appl. No.: 11/047,954

(22) Filed: Jan. 31, 2005

(65) Prior Publication Data

US 2006/0174033 A1 Aug. 3, 2006

(51) Int. Cl.
*G06F 15/16* (2006.01)
(52) U.S. Cl. ...................... 709/206; 709/205
(58) Field of Classification Search .................. 709/206
See application file for complete search history.

(56) References Cited

U.S. PATENT DOCUMENTS

| | | | | |
|---|---|---|---|---|
| 5,805,820 | A * | 9/1998 | Bellovin et al. ............. | 709/225 |
| 6,430,623 | B1 * | 8/2002 | Alkhatib ..................... | 709/245 |
| 6,772,227 | B2 * | 8/2004 | Alkhatib ..................... | 709/245 |
| 6,965,904 | B2 * | 11/2005 | Bankert et al. ........... | 707/104.1 |
| 7,058,683 | B1 * | 6/2006 | Belissent et al. ............ | 709/206 |
| 7,133,404 | B1 * | 11/2006 | Alkhatib et al. ............. | 370/392 |
| 7,191,187 | B2 * | 3/2007 | Takeshita et al. ........... | 707/102 |
| 7,249,175 | B1 * | 7/2007 | Donaldson .................. | 709/225 |
| 7,464,264 | B2 * | 12/2008 | Goodman et al. ........... | 713/154 |
| 2001/0032245 | A1 * | 10/2001 | Fodor ......................... | 709/206 |
| 2002/0004826 | A1 * | 1/2002 | Waite et al. ................. | 709/223 |
| 2002/0099814 | A1 * | 7/2002 | Mastrianni .................. | 709/224 |
| 2002/0120697 | A1 * | 8/2002 | Generous et al. ........... | 709/206 |
| 2002/0123999 | A1 * | 9/2002 | Bankert et al. ............... | 707/10 |
| 2003/0179871 | A1 * | 9/2003 | Ito et al. .................. | 379/93.24 |
| 2003/0229717 | A1 * | 12/2003 | Teague ....................... | 709/246 |
| 2004/0267907 | A1 * | 12/2004 | Gustafsson ................. | 709/219 |
| 2005/0064850 | A1 * | 3/2005 | Irlam et al. .............. | 455/414.1 |
| 2005/0198169 | A1 * | 9/2005 | Holten et al. ............... | 709/206 |
| 2006/0059337 | A1 * | 3/2006 | Poyhonen et al. .......... | 713/165 |
| 2006/0088026 | A1 * | 4/2006 | Mazur et al. ................ | 370/352 |
| 2006/0112166 | A1 * | 5/2006 | Pettigrew et al. ........... | 709/206 |
| 2006/0174033 | A1 * | 8/2006 | Gillum et al. ............... | 709/238 |

* cited by examiner

*Primary Examiner*—Saleh Najjar
*Assistant Examiner*—Waseem Ashraf
(74) *Attorney, Agent, or Firm*—Vierra Magen Marcus & DeNiro LLP

(57) ABSTRACT

A system and method for providing email using a flexible routing technique based on MX records. The method includes the steps of creating an MX record for a user, the MX record identifying a storage location for the user within the system; and routing mail within the enterprise email system using the information contained in the MX record. A system may include an inbound mail transfer agent coupled to an external network and an internal network; user email data storage having an address within the internal network; a user location database server containing a unique user token identifying a storage location for user email data in the user email data storage; and an internal DNS server including MX records for storage domains on the internal network.

18 Claims, 4 Drawing Sheets

User 1: record for user@example.com: 1.2.3.4 d5
DNS has a domain: 1-2-3-4-s0.mailrouting.local
For which the MX records are:                    410

| Name | Preference | Description |
|---|---|---|
| Bay1-u1.hotmail.com | 10 | Final destination for any mail for this storage unit |
| Spool224.mailrouting.local | 20 | Preferred spooler for bay1-u1 |
| Not-spool224.mailrouting.local | 30 | All other spooling groups besides 3, in case 3 isn't accessible |

DATACENTER MAIL ROUTING

BACKGROUND OF THE INVENTION

1. Field of the Invention

The present invention is directed to routing Email within an administrative email domain or set of domains, which in one embodiment to an email service facility housing a number of users, and in particular to a method for configuring mail routing in a private email domain service provider.

2. Description of the Related Art

Perhaps the most prevalent use of the Internet is communication via electronic mail. One of the most common forms of email is provided by Email Service Providers (ESPs) such as Yahoo! Mail, Microsoft Hotmail, Google GMail, and other free web-based email services.

Generally, such ESPs direct users running web-browsers to a cluster of computers which provide an email application to the user via the web-browser interface. However, other methods of accessing free email services, such as Post Office Protocol (POP) and Internet Message Access Protocol (IMAP) may be utilized. Mail directed to users having accounts associated with the ESP domain are likewise directed to the ESP's Message Transfer Agents (MTAs), which work with other devices within the ESP's server structure. In an architecture having a large number of mailboxes in a single location, mail acceptance servers are typically separated from storage servers, and there are generally many machines of each type.

Once the architecture separates the internal MTAs from the storage servers, the ESP architecture requires a methodology for routing mail internally. Current systems generally implement proprietary internal routing protocols that require each mail message to be processed again, often by an intermediate set of servers, to ensure routing of mail data to the actual storage servers is conducted accurately. However, this additional processing is resource intensive.

When individuals forward mail externally, mail typically goes from an originating E-mail client to an SMTP server. The SMTP server then retrieves/consults the MX record(s) of the domain in the E-mail address. For example, with "joe@example.com", the SMTP server would look for the MX records for example.com. In that example, the SMTP server might find the MX record of "mail.example.com". The MX record is a domain name, so the SMTP server then gets the address ("A") record for that domain name, and connects to the mail server. Each MX record has 2 pieces of information associated with it. The first is a preference number, and the second is the domain name of a mail server. If there are multiple MX records, the SMTP server will pick one based on the preference level, starting with the lowest preference number and working up. It is acceptable to have more than one MX record with the same preference.

A mechanism for simplifying and/or enhancing the routing of email messages in a administrative domain, such as an ESP, would be advantageous.

SUMMARY OF THE INVENTION

The invention, roughly described, comprises a system and method for providing email using a flexible routing technique based on MX records. In one embodiment, the invention is a method for routing mail in an enterprise email system. The method includes the steps of having an MX record which can direct mail for every user, the MX record identifying a storage location for the user within the system; and routing mail within the enterprise email system using the information contained in the MX record. In a further aspect, the invention may include the step of retrieving a user token and retrieving the MX record based on said user token prior to said step of routing mail.

In an alternative embodiment, the invention is a system for providing email to a plurality of users. The system may include an inbound mail transfer agent coupled to an external network and an internal network; user email data storage having an address within the internal network; a user location database server containing a unique user token identifying a storage location in the internal network for user email data in the user email data storage; and an internal DNS server including MX records for storage domains on the internal network. In a further aspect, the inbound mail transfer agent includes an SMTP server coupled to the external network and an internal DNS server, the SMTP server forwarding email to the user email data storage.

In another embodiment, the invention is a computer-readable medium having computer-executable instructions for performing steps comprising: storing an MX record for a user, the MX record identifying a storage location for the user within the system; receiving mail directed to a user; retrieving a user token for the user; retrieving the MX record based on said user; and routing mail within the enterprise email system using the information contained in the MX record.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers.

These and other objects and advantages of the present invention will appear more clearly from the following description in which the preferred embodiment of the invention has been set forth in conjunction with the drawings.

DETAILED DESCRIPTION

The invention provides a method for routing mail within an enterprise mail system by repurposing the existing standard MX record format, generally used for external routing of email on the Internet, to enable internal routing of the mail from an MTA to a storage server Specifically, the system hides the fields in the SMTP protocol that dictate the mail spooler preference level, causing the mail transfer agent to send the mail directly to the storage associated with the recipient.

Figure 1:
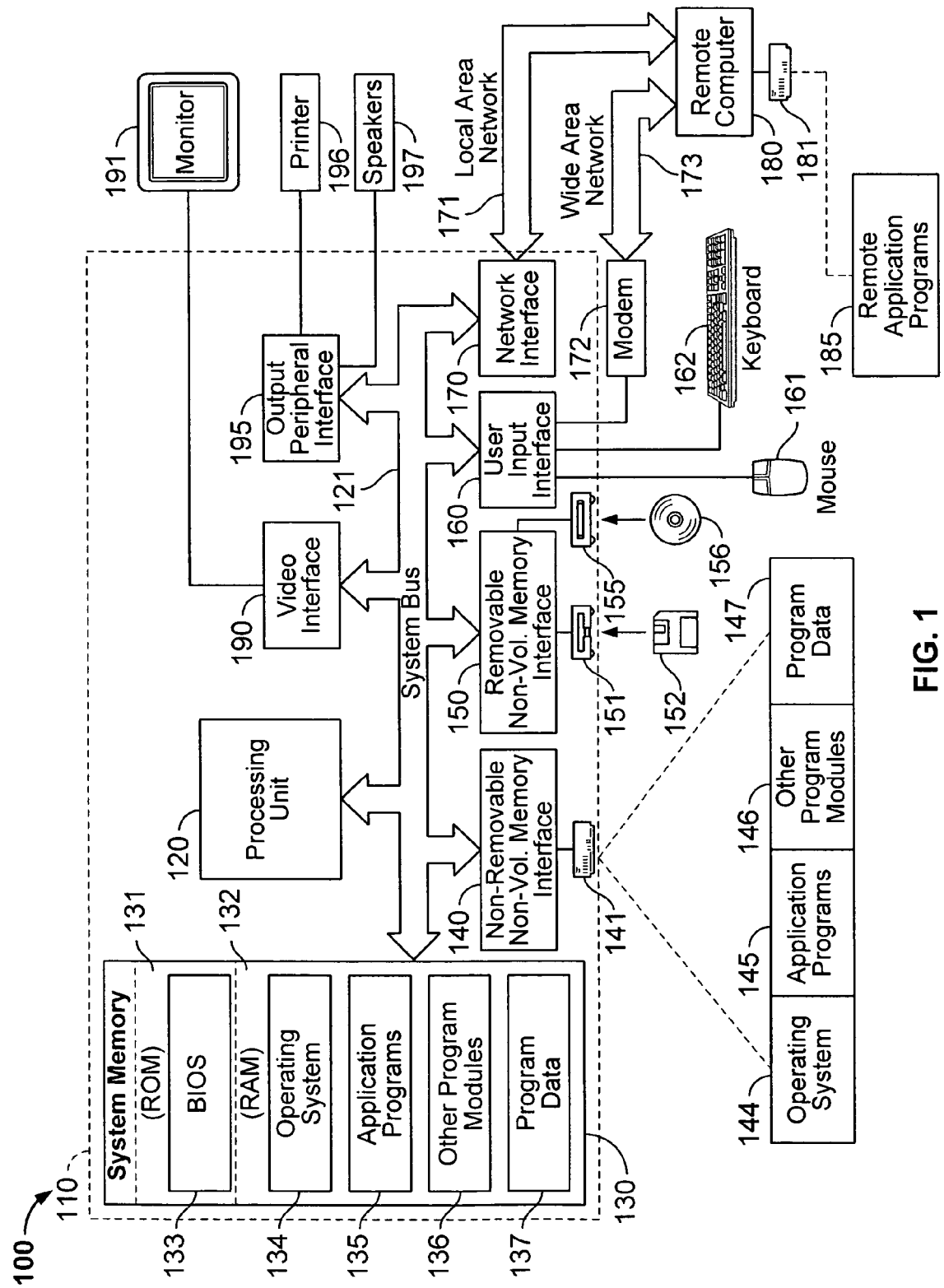
FIG. 1 depicts a processing device suitable for implementing computers, servers and other processing devices in accordance with the present invention.
Figure 2:
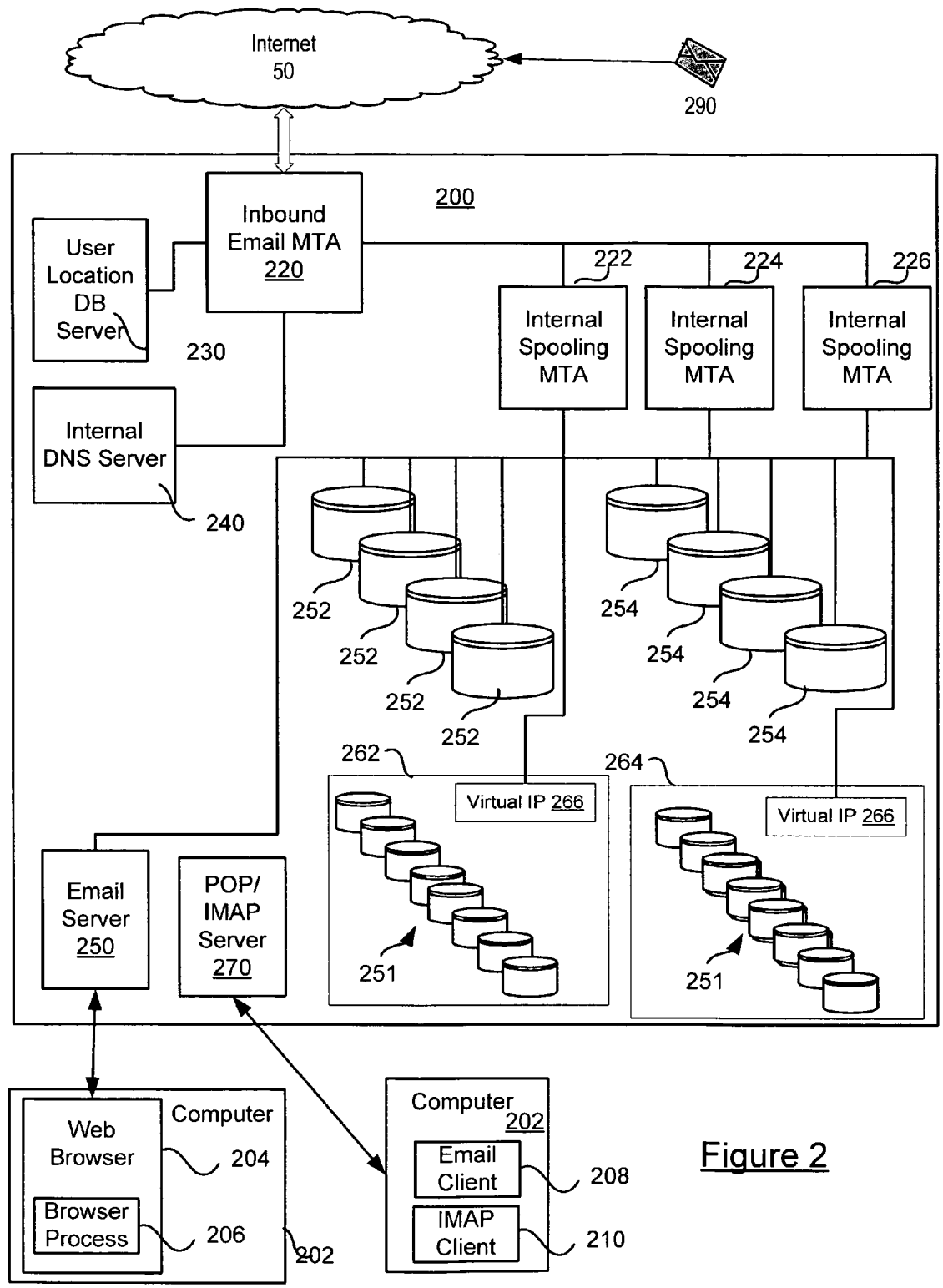
FIG. 2 is a block level diagram of a system suitable for implementing the present invention.

In the system of the present invention, an ESP may use a system such as that shown in FIG. 2 having a number of computing devices to implement the method of the present invention. An exemplary computing device for implementing any of the servers shown in FIG. 2 is shown in FIG. 1.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

FIG. 2 is a block level diagram of a system suitable for implementing the present invention. System 200 which may be implemented by an email service provider ESP may consist of, for example, an inbound email MTA 220, a user location database server 230, a DNS server 240, spooling MTAs 222, 224, 226, user mail storage units 252, 254, 262, 264, an email server 250 and a POP/IMAP server 270. System 200 allows users operating processing devices 202, 204 to access their email data. It should be understood that users may connect to system 200 via any number of public or private networks, including the Internet.

One goal of the present invention is to reduce the load on the inbound email MTA 220 so that messages are passed through the inbound email MTA 220 to user storage as quickly as possible. This allows users operating processing devices 202, 204 connecting to system 200 to access their email data in as rapid a fashion as possible. Inbound email MTA 220 is essentially a front end server to which emails 290 transmitted via the Internet (or other suitable network) to the system 200 are directed. The user location database server 230 is a data store of storage location information for each of the users having a user account or email address within system 200. The user location database server stores information for allowing other servers in the system to direct mail within the system to storage locations on storage units 252, 254, 262, 264 based on the routing instructions in the system 200. In one embodiment, the user location database server 230 stores a network address and disc number within each of the storage units for each individual user.

DNS server 240 stores internal routing records for the system 200. As discussed below, such information can be used by the inbound MTA to route email within the system 200 after the inbound MTA determines a users unique storage location from the user data store.

The system shows two different types of storage units. Storage units 252 and 254 are essentially large disc arrays which can be accessed by reference to an IP address and disc number. This information can be virtualized to specify a directory or set of directories which exist on one or more physical discs within each disc storage unit 252, 254. Storage units 252 and 254 represent disk storage units having directly associated IP addresses. Also shown are storage units 262 and 264, which comprise clusters of storage units 251, all of which are accessible through a virtual IP address 266, 268, respectively.

Internal spooling MTAs 222, 224, 226 are provided to spool messages which are directed to any of the storage units 252, 254, 262, 264 which for one reason or another cannot be delivered to said storage units. For example, the storage unit may be busy, down for maintenance, or nearing capacity, in which case the message can be spooled on any of the MTAs 222, 224, 226 until such time as the message can be delivered to the particular storage unit for the user.

In one embodiment, each of the internal spooling MTAs 222, 224, 226 may comprise a preferred location for one or more of the disc storage units 252, 254, 262, 264. For example, internal spooling MTA 222 can be the preferred spooling address for message data store 252. In cluster 262 internal spooling MTA 224 can likewise be the preferred spooling agent for data storage unit 254 and internal spooling MTA 226 can be the preferred spooling agent for cluster 264. It should be recognized that each of the internal spooling MTAs 222, 224, 226 can address any of the storage units 252, 254, 262, 264, and that the aforementioned preferred status of the spoolers with respect to the storage units is in essence a traffic routing consideration.

Email server 250 may comprise a web server which provides an email interface to a web browser 208 which institutes a browser process 206 on a user computer 222. Email server 250 can render email data from the data storage units to a user using computer 202 to access the email system 200. Likewise POP/IMAP server 270 can provide email data to a POP email client 218 or an IMAP client 210 on user computer 212.

In prior art email service provider systems 200, the inbound email transfer agent would look-up the user disk storage location information from user location database server 230 and attempt to route email directly to the data storage units 252, 254, 262, 264. This was generally implemented by hard-coding specific instructions for handling the storage location syntax within the MTA and issuing storage commands to the storage location.

In accordance with the present invention, the inbound email MTA uses standard principles of simple mail transfer protocol (SMTP) to determine the delivery location in data storage units for a given user and route an incoming email to either the data storage units or a spooler by accessing MX records present in the internal DNS server 240 for a user's routing domain. This allows convenient routing and customization of the internal structures in the ESP for various purposes, as described below. In addition, other information about where to send and store email data may be encoded in the MX record.

While the invention will be described as implemented in the context of the system of FIG. 2, it will be recognized that application of the principles of the invention are not limited to a private or enterprise system, or a single email domain. The principles can be utilized to selectively route or re-route emails by modification of MX records to utilize standard SMTP processes and servers to route mail as desired by a routing administrator.

Figure 3:
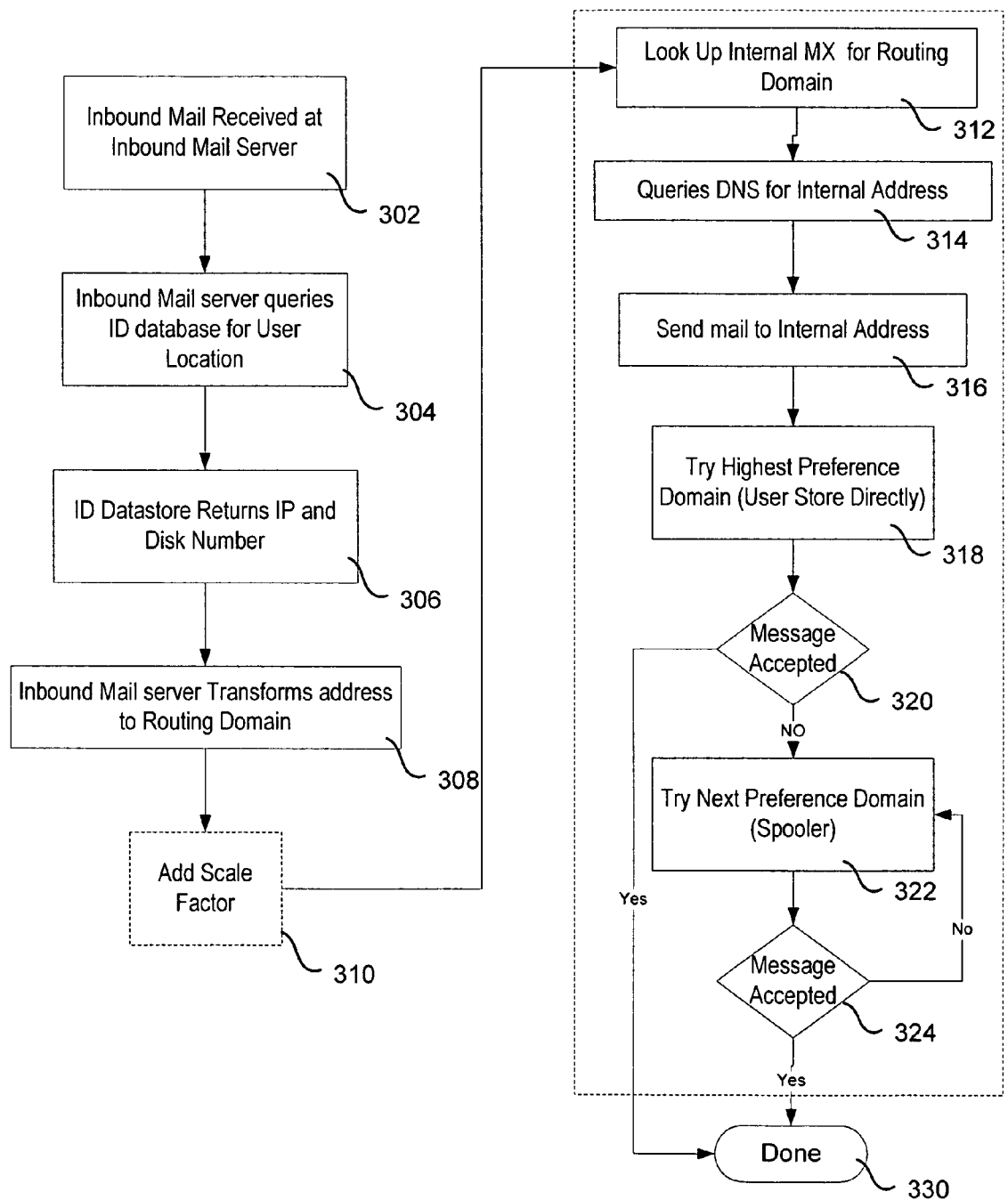
FIG. 3 is a flowchart illustrating one embodiment of a method of the present invention.

FIG. 3 shows a flow-chart illustrating one embodiment of a method of the present invention. The method of the present invention will be understood with reference to both FIGS. 2 and 3, though the specific system of FIG. 3 is not required to implement the method of the present invention. At step 302, an inbound email 290 is received by the system via Internet 50. The email will generally be received by inbound email server 220. Inbound email MTA 220 will receive email addressed to any user within the domain which, in this example might be "example.com." In step 304, the ID database will be queried for the user storage location. In one embodiment, the inbound email MTA 220 will query the ID database for the user location. At step 306, the unique user token will be returned. In the system of FIG. 2, the ID data store will return the IP and disc number for a particular user. The given user will have, for example, an email address of "user@example.com" and a record of, for example, 1.2.3.4 D5. An example of such a record 410 is shown in FIG. 4.

Next, at step 308, the address will be transformed into to a routing domain. This step may also be performed by the inbound email MTA 220. This step comprises using a transformation of, for example a textual one, replacing dots with dashes and appending a root domain which converts the address into information that the SMTP server residing in the inbound email MTA 220 can use to route the mail.

At step 220, the MX record for the routing domain is retrieved at step 312. Again, the inbound email MTA 220 will look-up the MX record for the routing domain. Optionally, at step 310, a scale factor will be added. As will be described more fully below, the scale factor is an identifier for storage within each of the clusters 262, 264, which specifies a storage location with greater specificity to the SMTP routing agent in the inbound email MTA 220. It should be understood that while each user will have an associated user token indicating the user's final storage destination, a much smaller number of MX records will exist which are associated with the routing domains, since each storage location handles hundreds to millions of users.

Figures 4, 5:
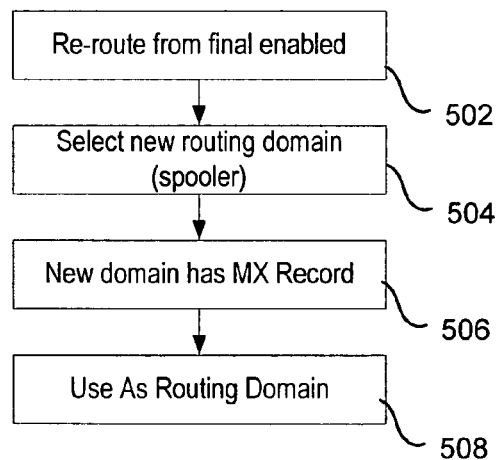
FIG. 4 is an exemplary MX record utilized in the present invention.
FIG. 5 is a flowchart illustrating an alternative embodiment of the present invention

An exemplary MX record for the DNS domain 1-2-3-4-s-0.mailrouting.local which has been transformed by the inbound email server at step 308 is shown in FIG. 4. In this example, there are three entries in the MX record for the mailrouting.local domain. The first entry is to a disc destination, "bay1-e1.example.com." This entry has the highest preference (10) and is the final destination for any mail for this storage unit. The next entry (preference 20) is for a spooler, in this case spooler 224. If mail cannot be delivered directly to the user store, mail is routed to the preferred spooler 224 which can then route mail directly to the user's store 252. If mail to spooler 224 is not accepting email, then the entry at preference 30 directs that the mail be directed to any other spooler group.

Once the MX record for the particular routing domain is retrieved at step 312, the internal DNS address for the storage location within the domain can be retrieved at step 314. In one embodiment, an SMTP service in the inbound email MTA 220 can query the DNS server 240 for the internal address of the particular storage location for the routing domain. Next, the email is forwarded to the internal address location using standard SMTP services at step 316.

In one embodiment, the inbound email MTA 220 sends the mail to the internal address using standard SMTP protocol, a modified version thereof, or an entirely different protocol executing all or a subset of the same steps as SMTP, at step 316. In accordance with the entries in the MX record, the inbound email MTA 220 will first try the highest preference domain at step 318, which in the entry example at FIG. 4 is the direct location of the user store. If the message is accepted at step 320, then the method is complete at step 330. If the message is not accepted at step 320, then the entry tries the next preference domain, which in this case is the spooler 224. If the message is accepted at step 324, then again, the method is done. If not, the method will continue looping between steps 324 until it reaches the lowest preference record in the MX record. In the example of FIG. 4, this will be any spooler in the entry set.

In accordance with the invention, the SMTP service in the inbound email MTA 200 performs the mail forwarding in a standard manner, forwarding inbound mails within the domain by retrieving MX records and forwarding emails based on MX records. This simplifies construction of the inbound MTA by allowing use of standard SMTP service components. It should be noted that the MX records utilized in the DNS server can be both on the inbound email agent 220 and on the spoolers 222, 224, 226. On the inbound email MTA 220, the process is unmodified by the MX record. However, on the spoolers, records can be hidden from the SMTP servers in the spoolers. This prevents those spoolers from sending email anywhere but to the user stores 252, 254, 262, 264. In one embodiment, the method for choosing which records to hide may be based on a configurable preference level, for example, such that entries above level 10 are hidden.

The invention has the effect of ensuring that all MTAs prefer to deliver email directly to the final data storage unit. Mail routing is hence a very basic operation within the inbound email transfer agent 220. MTA 220 queries the user or data store 230, does a textural transformation, and allows the standard SMTP server built into it to do the majority of its work in accordance with SMTP standards.

Using MX records in accordance with the present invention allows certain spoolers to be "preferred spoolers," meaning that fewer spoolers are trying to communication to any given user data store, allowing for greater queuing and connecting efficiency.

In a further embodiment of the invention, a specialized DNS resolver is utilized in the inbound email MTA 220 and internal spooling MTAs 222, 224, 226. Thus, in any case where the internal DNS server 240 becomes unavailable, the inbound MTAs or spoolers can utilize their DNS record cache to continue to route email properly, even when the TTL on those records would normally require those records not be used. Similarly, if no records are present in the cache for a given storage location, which is the case for instance when the MTA hasn't yet needed to deliver to it since it started up, the DNS resolver can apply logic to obtain or guess at a delivery location. In one embodiment, such logic may undo the technique for constructing the MX record names from the user token.

Because any inbound email MTA 220 configured to be utilized in an email service providers system 200 is capable of receiving SMTP connections, building routing protocols into the inbound email transfer agent 220 allows utilization of the full power of a standard SMTP server. Utilizing the MX records in the fashion described in the present invention will allow the outbound components of the SMTP transfer agent to be utilized. In addition, routing decisions with respect to changing the configuration of the internal data storage units 252, 254, 262, 264 can be made by simply altering the MX records for the DNS records of the email system 220.

The user location data store provides a unique token, in this case an IP and disk number. However, the invention can utilize any type of unique token for the user which can be converted into a routing domain and MX record for use in accordance with the system of the present invention. In one case, the present example illustrates a location based on an IP and disc ID. However, the token may not be as described herein, but can be some other unique token which identifies the mail routing domain.

As noted above, an optional step and method of FIG. 3, the method may assign a scale factor for use in identifying one or more discs in the clusters 262, 264. When routing information to each of the clusters 262, 264, a virtual IP address 266, 268, respectively, is utilized. SMTP servers allocate outbound resources, such as connections, based on domains. The scale factor allows further division of a network address, effectively increasing the amount of traffic that can go to that network address. This can be advantageous if different addresses have different mail delivery capacities. Splitting one destination into multiple domains is not without cost, however, since a standard SMTP server will now open different connections to deliver mail to what is effectively the same location because it sees them as different domains. The costs associated with this effect can be partially mitigated by associating each scale factor with a distinct set of delivery resources within that location Moreover, it should be recognized that a ten recipient message need not be spooled to each individual's preferred internal spooling record within the system 200. For example if a message is addressed to user 1 at example.com, user 2 at example.com and user 3 at example.com, and the system has determined that all three recipients cannot be delivered currently, the system will select one of the three users to perform the method of the invention set forth with respect to FIG. 3 and send the entire message to be spooled at that individual's spooling MTA 222, 224, or 226. That spooling MTA will direct the routing of the individual message to each individual user's user data store in accordance with the sequence of steps 325 shown in FIG. 3. The routing serves to create a bias in the traffic for each spooler's preferred delivery locations, but not so strong a bias as to override the costs of splitting one message for many recipients into multiple messages.

The system of MX records described thus far provides for routing mail with the provision of always trying to deliver to the final message store. In some operational circumstances however, this is not the desired behavior. For example, in the case of an extended outage of the final delivery location, it may be desirable to route to a new spooling location. In such cases, a process running in the MTA can choose a spooling location and use the MX records for that spooling location to enable such behavior. In one embodiment, the algorithm may choose the first record after a "spooler preference" threshold as the domain to route to. Further, this domain would have an MX entry corresponding to the preferred spooling group, and subsequent records at an equal but higher preference level to allow for failover from the preferred spooler. In the example of FIG. 4, the hostnames listed in the record are themselves domains with MX records to specify how mail should be delivered to them.

This process is illustrated in FIG. 5 which represents step 314 in FIG. 3 in this alternative of the present invention. At step 502, the inbound MTA 220 will invoke the alternative routing process and at step 504, select the new domain to route to. The MX record for the "re-routed" domain is used as a routing domain for the email at step 508.

In yet another example of the present invention, metadata about the destination can be encoded into the MX entry's fields. For example, preference entry of 11 may indicate a particular type of store, the number of connections allowed to the store, and whether the physical data store is available or not, near to capacity, or whether connections are allowed. One such encoding may be to use the first digit of the preference level for ordering, and the second as a literal or representative number for how many connections are allowed to the domain. In yet another example, MX records can include such information in the time-to-live field of the entry. Similar information can be encoded in the time-to-live entry of such MX records.

It should be further recognized that the application of the invention is not limited to ESPs. The invention may be utilized with any private mail routing system.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for routing mail in an enterprise email system, comprising:
providing a plurality of storage locations on a plurality of storage units, each storage unit having at least a subset of the plurality of storage locations, at least one of the plurality being associated with a user of the enterprise email system, each storage location including a storage address, each user having at least one unique storage location associated with the user;
receiving an email at an inbound mail transfer agent and retrieving a unique user token from a user location database, the user token identifying the storage location for a user from the user location database within the enterprise email system, the user token comprising at least an Internet Protocol (IP) address and disk address, the inbound mail transfer agent including a transformation engine converting the user token to a domain including a transposition of the IP address and disk address;
retrieving an MX record for a user based on the domain created from the user token via an internal DNS server within the enterprise email system, the MX record identifying a routing to the storage location for the user within the system; and
routing mail within the enterprise email system to the storage location using the information contained in the MX record using at least one internal mail transfer agent.

2. The method of claim 1 wherein the method further includes caching MX record data, the MX record includes a time-to-live field, and the method includes the step of ignoring the time to live field by using cached MX record data when unable to access domain name records.

3. The method of claim 1 wherein a known mapping transformation is applied during the primary transformation of the user token to achieve different results for subsets of possible destination domains.

4. The method of claim 1 wherein said MX record includes entries having a preference value that signifies a final storage destination for the message.

5. The method of claim 1 wherein said MX record includes entries having a preference value that signifies a preferred intermediate destination.

6. The method of claim 1 wherein said MX record includes entries having a preference value that signifies a default destination when higher preference destinations are unavailable.

7. The method of claim 1 wherein the step of creating an MX record includes creating a record wherein at least one host-name in the destination of said record is a domain with a new MX record specifying mail delivery.

8. The method of claim 7 wherein the new MX record set is an alternative delivery path for the purposes of queuing mail for the final delivery location.

9. The method of claim 1 wherein said MX record includes entries having a preference, and each preference encodes destination metadata.

10. The method of claim 9 wherein the preference status encodes an available condition, an unavailable condition, or a capacity condition.

11. The method of claim 1 wherein the MX record includes a time-to-live field, and said a value in said field encodes meta data about a storage destination for an email.

12. A system for providing email to a plurality of users, comprising:
   an inbound mail transfer agent coupled to an external network and an internal network;
   user email data storage comprising a plurality of storage locations on a plurality of storage units, each storage unit having at least a subset of the plurality of storage locations, at least one of the plurality of storage locations being associated with a user of the enterprise email system, each storage location including a storage address, each user having at least one unique storage location associated with the user identified by a unique user token providing an address within the internal network;
   an internal DNS server including MX records identifying routing to the user email data storage on the plurality of storage locations;
   a user location database server containing each unique user token identifying a storage location for user email data in the user email data storage, wherein the user token comprises at least an Internet Protocol (IP) address and disk address, and the inbound mail transfer agent includes a transformation engine converting the user token to an internal domain for the MX record, including a transposition of the IP address and disk address; and
   at least one internal mail transfer agent receiving mail from the inbound mail transfer agent via the internal network based on an MX record associated with the user and storing the mail at the user storage location.

13. The system of claim 12 wherein the inbound mail transfer agent includes an SMTP server coupled to the external network and the internal DNS server to provide the routing data necessary to forward email to the user email data storage.

14. The system of claim 12 wherein the system further includes a plurality of spoolers.

15. The system of claim 14 wherein the MX record includes a number of entries having a preference, at least one of said entries includes a final storage destination comprising said user email storage.

16. The system of claim 15 wherein the MX includes entries having a preference, and at least one preference signifies a preferred intermediate destination.

17. The method of claim 14 wherein said MX record includes entries having a preference, and each preference signifies a default destination.

18. A system of processing devices each including at least one computer-readable medium having computer-executable instructions for instructing the processing devices to perform steps comprising:
   receiving an email at an inbound mail transfer agent and retrieving a unique user token from a user location database, the user token identifying a storage location for a user within the enterprise email system on one of a plurality of storage units for a user, the user token comprising at least an Internet Protocol (IP) address and disk address, the inbound mail transfer agent including a transformation engine converting the user token to a domain including a transposition of the IP address and disk address;
   retrieving from an internal DNS server an MX record for a user based on the domain created from the unique user token the MX record identifying at least one spooling location for the user, the MX record identifying a storage location for the user within the system and at least one alternative delivery location within the system; and
   routing mail within the enterprise email system to the storage location or the alternative delivery location using the information contained in the MX record using at least one internal mail transfer agent.

* * * * *

UNITED STATES PATENT AND TRADEMARK OFFICE
CERTIFICATE OF CORRECTION

PATENT NO.       : 7,647,380 B2
APPLICATION NO.  : 11/047954
DATED            : January 12, 2010
INVENTOR(S)      : Gillum et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1112 days.

Signed and Sealed this

Twenty-eighth Day of December, 2010

David J. Kappos
*Director of the United States Patent and Trademark Office*